United States Patent

[11] 3,547,342

[72] Inventors Gene R. Smith
166 E. 35th St., New York, N.Y. 10016;
Lydia M. Saltzman, 119 W. 15th St., New York, N.Y. 10011

[21] Appl. No. 818,966
[22] Filed April 24, 1969
[45] Patented Dec. 15, 1970

[54] RECORD COVER
5 Claims, 5 Drawing Figs.

[52] U.S. Cl. .......... 229/68, 229/72; 206/62.5
[51] Int. Cl. .......... B65d 85/58
[50] Field of Search .......... 229/68, 72; 206/62PR

[56] References Cited
UNITED STATES PATENTS
1,440,737 1/1923 Jones .......... 206/62

*Primary Examiner*—David M. Bockenek
*Attorney*—Amster & Rothstein

ABSTRACT: A record cover includes an outer jacket comprising first and second substantially circular panels joined together in edge to edge relation along a juncture line and foldable about the juncture line into face to face closed relation. A third panel overlays the interior surface of the first panel forming a record-receiving cavity, the third panel being foldable along a crease line away from the first panel to permit access to the record-receiving cavity.

INVENTORS
GENE R. SMITH
LYDIA M. SALTZMAN
BY
Amster & Rothstein
ATTORNEYS

RECORD COVER

RECORD COVER

The present invention relates generally to protective and ornamental enclosures for phonograph records and more specifically relates to an improved circular record cover.

Conventional record jackets generally comprise two square sheets of paperboard secured together about three sides of their common perimeter. Such record jackets do not conform to record shape and are intended to be used in conjunction with a protective plastic or paper inner sleeve which securely encloses the record. Frequently the inner sleeve is not used and as a consequence the record is free to move within the jacket or to slip out from the jacket, causing the record to become scratched or otherwise damaged. There is thus a need for a sturdy record jacket which can securely enclose a record while being convenient to use.

It is an object of the present invention to provide an attractive and protective cover for a phonograph record wherein the record can be easily inserted and removed and wherein the record is securely retained for storage; a further object of the invention is the provision of a phonograph record cover which does not require a separate internal protective sleeve.

In accordance with a preferred embodiment demonstrating the objects and features of the present invention, a phonograph record is enclosed within a cover comprising a jacket including first and second substantially circular panels joined together in substantially edge to edge relation along a juncture line and being foldable about the juncture line into face to face closed relation. A third substantially circular panel having a diameter substantially equal to the diameter of the first and second panels overlays the interior surface of the first panel and is normally congruent therewith. The first and third panels are joined along at least a portion of their adjacent surfaces to form a record-receiving cavity with the third panel being foldable along a crease line to permit access to the record-receiving cavity.

The above brief description as well as further objects, features and advantages of the present invention will be more fully appreciated by reference to the following detailed description of a presently preferred, but nonetheless illustrative embodiment in accordance with the present invention, when taken in conjunction with the accompanying drawing, wherein.

Figure 1:
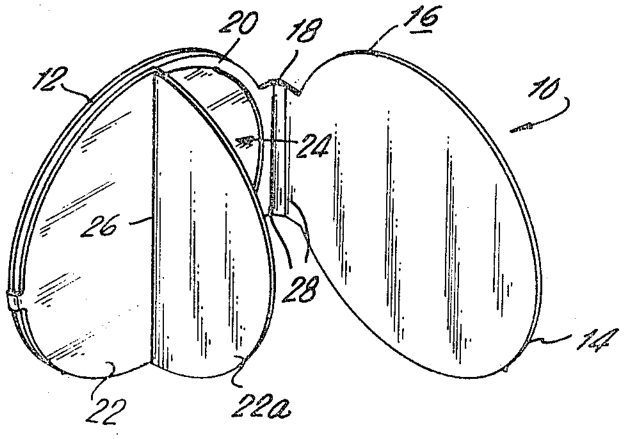
FIG. 1 is a perspective view of the phonograph record cover in open position.
Figure 3:
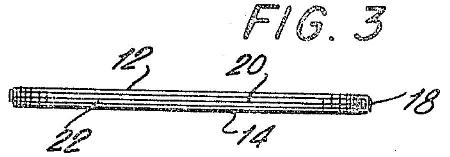
FIG. 3 is a top view of the record cover in closed position.
Figure 2:
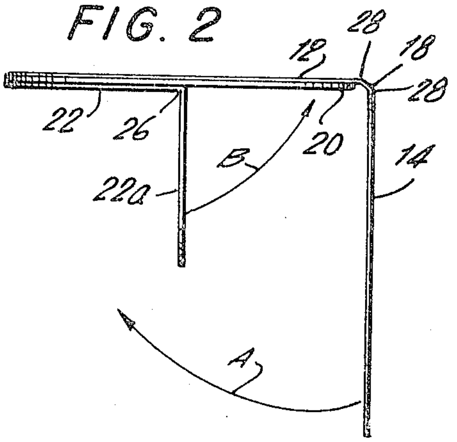
FIG. 2 is a top view of the phonograph record cover in open position.
Figure 4:
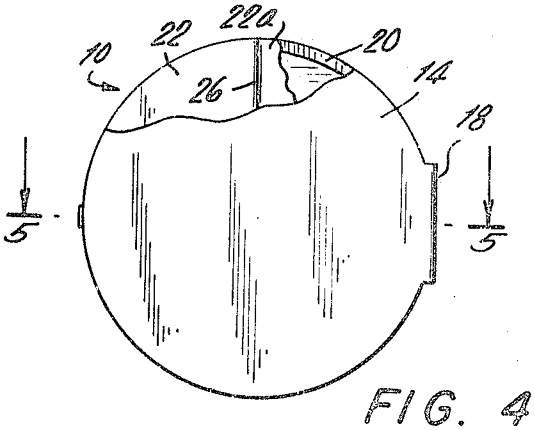
FIG. 4 is a front view of the record cover in closed position.
Figure 5:
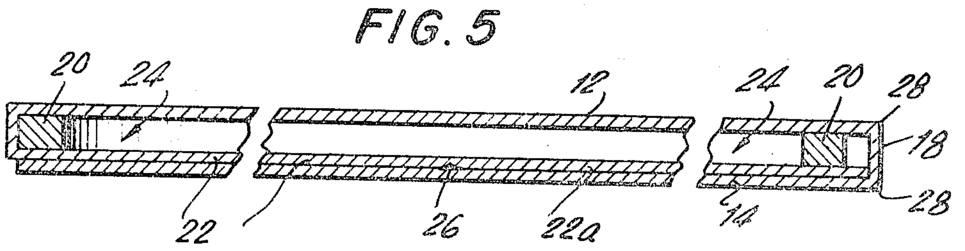
FIG. 5 is a cross-sectional view taken along line 5–5 in FIG. 4 with the center of the record cover broken away.

Referring to the drawing, FIG. 1 shows a record cover 10 constructed in accordance with a preferred embodiment of the invention. The cover comprises a jacket 16 including a first substantially circular panel 12 and a second substantially circular panel 14 separated by a connecting section 18. The jacket 16 is foldable about connecting section 18 in the direction of arrow A in FIG. 2, so that panels 12 and 14 come together in face to face closed relation as shown in FIG. 3. Connecting section 18 is scored along two parallel score lines 28 to facilitate folding.

To maintain a record within the jacket, an annular ring 20 having an internal diameter slightly larger than the diameter of a phonograph record and having an external diameter equal to the diameter of panel 12 is secured to the inner surface of panel 12. Ring 20 is shown as a separate and distinct element adhesively secured to panel 12, but it is to be understood that ring 20 may be molded integral with panel 12. Panel 12 and ring 20 together form a record cavity 24 which is dimensioned to receive a standard size phonograph record.

A third substantially circular panel 22 overlays the inner surface of panel 12 and ring 20 and encloses the record-receiving cavity 24. Panel 22 is secured to ring 20 along a section of its perimeter and includes a score line 26 defining a cover flap **22*a*. The cover flap is foldable away from ring 20 about line 26 to permit a record to be inserted in cavity 24. In the preferred embodiment shown, panel 22 is secured to ring 20 along a 180° section of its perimeter and score line 26** in a diameter line.

In the preferred embodiment of the invention, panels 12, 14 and 22 are constructed of paperboard and may include laminations of other materials or their inner and outer surfaces. It is to be understood, however, that plastic or any other suitable material may be used and that the panel surfaces are adapted to receive printed copy. Also, it is to be understood that panels 12 and 14 may be provided with a clasp to retain the record jacket in closed position once the record is inserted.

The above-described record cover provides a safe and convenient enclosure for phonograph records and is easy to manufacture. The entire jacket may be fabricated from a single sheet of material cut to form three circular panels joined in edge to edge relation with ring 20 being adhesively secured, by heat sealing or otherwise, to the center panel.

In a typical sequence of use, panel 14 is folded away from panel 12 to a position approximately coplanar with panel 12, and the cover flap **22*a* of panel 22 is folded about score line 26 into an upright position with respect to panel 12. A record may then be inserted in well 24. The cover is closed by folding section 22*a* down over ring 20 and folding panel 14 over panel 22** as shown by arrows A and B in FIG. 2.

It is to be understood that the above described arrangement is merely an example of the application of the principles of the present invention. Other embodiments may be devised by those skilled in the art without departing from the spirit or scope of the invention. For example, the embodiment of the invention disclosed herein may be adapted to receive two records by providing a second ring similar to ring 20 and a second overlaying panel similar to panel 22 on the inner surface of panel 14.

We claim:

1. A cover for a phonograph record comprising first and second substantially circular panels, each having a diameter at least as large as the diameter of said phonograph record, said first and second panels being joined together in substantially edge to edge relation along a juncture line and being foldable about said juncture line into face-to-face closed relation, and a third substantially circular panel having a diameter substantially equal to the diameter of said first and second panels, said third panel overlying the interior surface of said first panel and being normally congruent therewith, said first and third panels being joined together along a selected portion of their corresponding perimeters to permit insertion of a phonograph record therebetween, said third circular panel including a flap portion foldable away from said first panel when said first and second panels are apart to permit insertion and removal of said record.

2. A cover for a phonograph record in accordance with claim 1 including an annular separator ring intermediate said first and third panels securing said first and third panels together and maintaining said first and third panels a selected distance apart to form a record-receiving cavity therebetween.

3. A cover for a phonograph record in accordance with claim 2 wherein said third panel is secured to said annular ring over a substantially 180° section of said annular ring and is foldable about a diameter line to form said cover flap.

4. A cover for a phonograph record as defined in claim 1 wherein each of said panels comprises at least one sheet of paperboard.

5. A cover for a phonograph record as defined in claim 1 formed of a single sheet of laminant material including a connecting section intermediate said first and second panels.